(No Model.) 2 Sheets—Sheet 1.

E. S. VOTEY & W. D. WOOD.
TUBULAR PNEUMATICALLY OPERATED VALVE FOR PIPE ORGANS.

No. 536,976. Patented Apr. 2, 1895.

(No Model.) 2 Sheets—Sheet 2.

E. S. VOTEY & W. D. WOOD.
TUBULAR PNEUMATICALLY OPERATED VALVE FOR PIPE ORGANS.

No. 536,976. Patented Apr. 2, 1895.

Witnesses
O. B. Basinger
H. A. Martin

Inventors
Edwin S. Votey
William D. Wood
By their Attorney
Newell S. Wright

UNITED STATES PATENT OFFICE.

EDWIN S. VOTEY AND WILLIAM D. WOOD, OF DETROIT, MICHIGAN.

TUBULAR PNEUMATICALLY-OPERATED VALVE FOR PIPE-ORGANS.

SPECIFICATION forming part of Letters Patent No. 536,976, dated April 2, 1895.

Application filed April 7, 1894. Serial No. 506,712. (No model.)

*To all whom it may concern:*

Be it known that we, EDWIN S. VOTEY and WILLIAM D. WOOD, citizens of the United States, residing at Detroit, county of Wayne, State of Michigan, have invented a certain new and useful Improvement in Tubular Pneumatically-Operated Valves for Pipe-Organs; and we declare the following to be a full, clear, and exact description of the invention, such as will enable others skilled in the art to which it appertains to make and use the same, reference being had to the accompanying drawings, which form a part of this specification.

Our invention is designed to provide a tubular pneumatically operated valve for pipe organs, of superior utility, simplicity and economy, the same being adapted to control the passage of air to and from a pneumatic controlling a valve governing the admission of wind to the wind chest with which the pipes are connected.

To these ends our invention consists of the construction, combination and arrangements hereinafter specified and claimed and illustrated in the accompanying drawings, in which—

Figure 1:
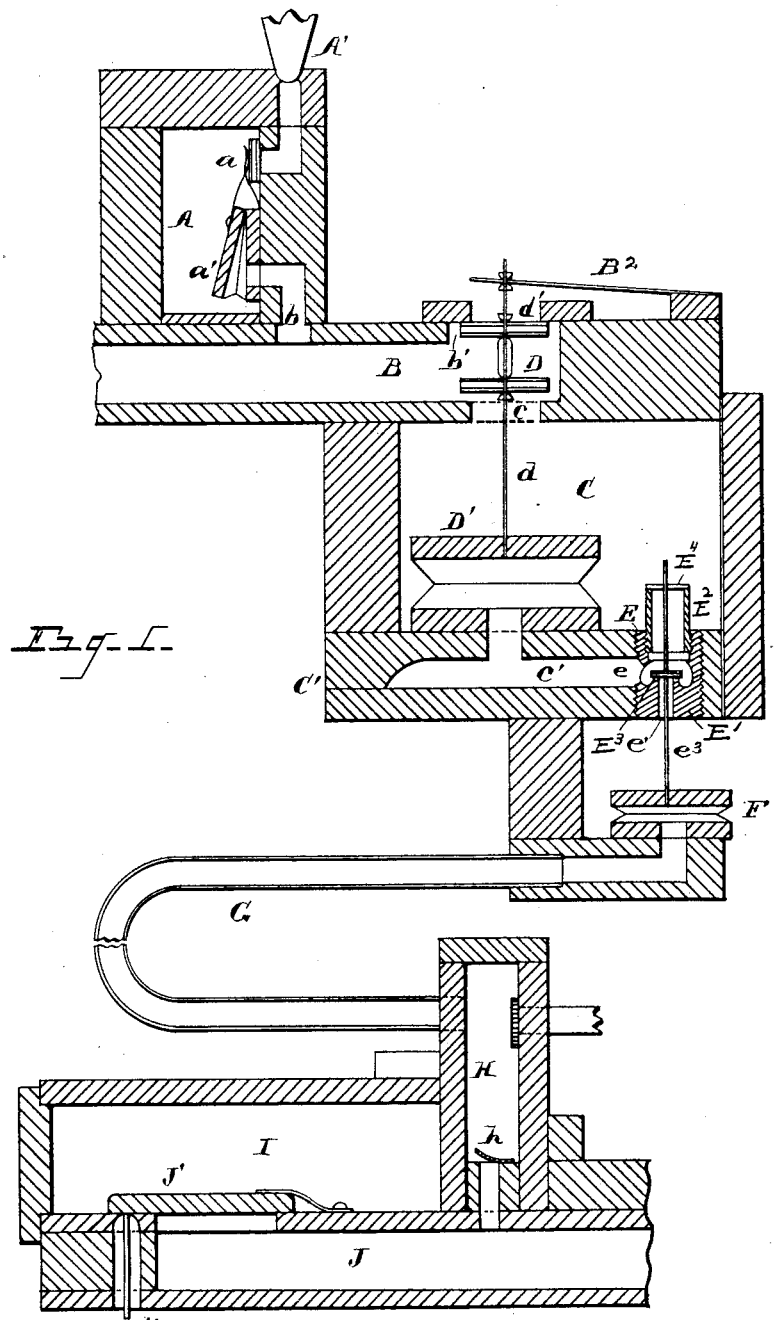
Figure 2:
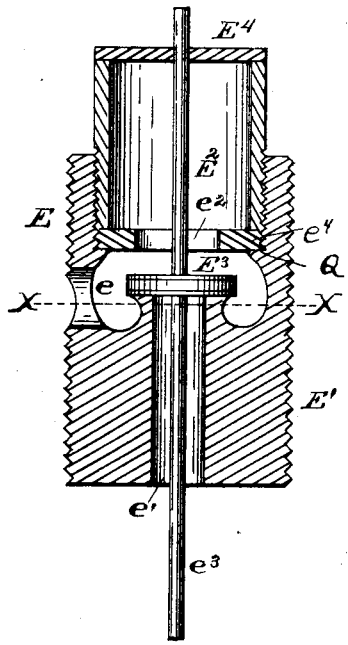
Figure 3:
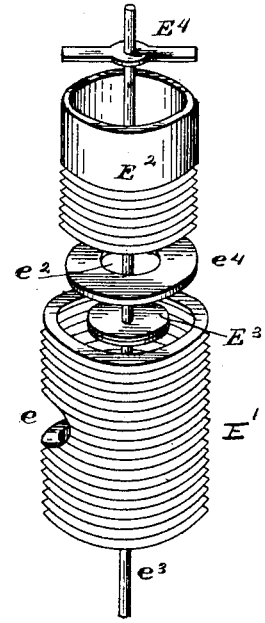
Figure 4:
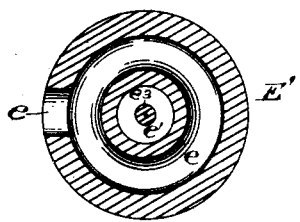
Figure 5:
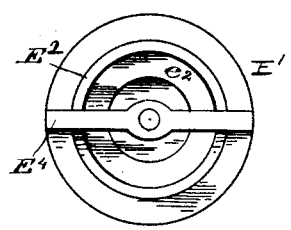

Figure 1 is a general diagram view illustrating our invention, showing parts in vertical section, and parts in elevation. Fig. 2 is a detail view in vertical section of the tubular valve. Fig. 3 is also a detail view of the same in perspective, the parts being separated one from the other to distinguish them more clearly. Fig. 4 is a horizontal section on the line $x$—$x$ Fig. 2. Fig. 5 is a plan view of the valve illustrated in Fig. 2.

We carry out our invention as follows:

A is a wind chest communicating with the pipes A'.

"$a$" is a valve controlling the communication. "$a'''$" is a pneumatic operating said valve "$a$." B is a wind duct communicating with said pneumatic, as through a passage "$b$."

C is a wind box communicating with the wind duct B, as through an orifice "$c$," controlled by a valve D operated by a pneumatic D' connected therewith, as by a rod "$d$."

The duct B exhausts through a passage "$b'$," controlled by a valve "$d''$" also connected with the rod "$d$" and operated by the pneumatic D'. $B^2$ is a spring to hold the valve D normally open when there is no wind in the chest C.

E denotes our tubular valve engaged in the base C' of the wind box C, said base being also provided with a channel "$c'''$" communicating with the pneumatic D' and through the tubular valve E with the wind box C. The tubular valve consists essentially of a cup E', constructed with an orifice "$e$" and with an exhaust orifice "$e'$." Engaged with the cup E' is a cylindrical top $E^2$, open at its upper end and opening at its lower end into the channel "$e$," as through an orifice "$e^2$."

$E^3$ is a valve normally seating upon the upper end of the passage "$e'$," but when lifted off said seat it closes the passage "$e^2$" and opens the passage "$e'$."

The cup E' preferably has a screw threaded engagement in the base C' of the wind box C.

The valve $E^3$ is connected by a stem "$e^3$" with a pneumatic F by which the valve is operated, the upper end of the stem passing through a guide bar $E^4$. The passage "$e^2$" may be constructed in a disk or plate "$e^4$" held in place by the cylinder $E^2$.

G is a key controlled pipe or duct communicating with the pneumatic F and communicating with a flapper box H.

An air trunk I, which is constantly filled with wind when the organ is in use, leads into an air duct J, the communication therebetween being controlled by suitable valves "J'," there being one such valve for each of the keys. The valves "J'" are actuated by means of a sticker "$j'$" engaged by a key K on the manual, corresponding to the duct G. The air duct J communicates with the flapper box H through a flapper or other valve "$h$."

The operation of the device will now be understood. By pressing upon one of the keys of the manual the corresponding valve "J'" is lifted, allowing air to pass from the air trunk I through the pipe G into the pneumatic F. This action lifts the valve $E^3$, closing the port or passage "$e^2$" and opening exhaust passage "$e'$," allowing air in the pneumatic D' to exhaust, thereby seating the valve D and allowing the duct B to exhaust through the passage "$b'$." By this means the pneumatic $a'$ is contracted by the pressure of the wind in the box A, opening the valve "$a$" to the corresponding pipe. On releasing the key K air is cut off from the pneumatic F, which will then exhaust, closing the outlet passage "$e'$" of the tubular valve and allowing wind to pass from the box C through the tubular valve to the pneumatic D', lifting the valve D and closing the valve "$d'$," thereby permitting wind from the box C to pass to the pneumatic "$a'$" to close the valve "$a$."

Our invention not only contemplates the employment of this tubular valve in this particular connection and relation with other parts of the organ shown and described, but also for any use to which it may be found adapted.

We have in this construction essentially a balanced valve, since when the pneumatic F is free to exhaust, the slightest pressure from the interior of the box C suffices to seat the valve $E^3$. The pneumatic F works up straight. The weight of the stem with its valve $E^3$ and the weight of the top of the pneumatic assists in closing the valve $E^3$ to cut off the exhaust through the cup.

The cup E' and the top $E^2$ are preferably made of metal and form a case for the valve. The cup E' is constructed with a flange or seat Q, upon which rests the plate "$e^4$," said plate being firmly held in place by the screw threaded connection of the top $E^2$ with the cup E'.

It will be observed since the parts are made of metal no adjustment will be required, as there can be no shrinking or swelling of the parts and they may be accurately fitted the one in relation with the other in their first construction, and in putting them together the guide bar $E^4$ insures the perfect seating and operation of the valve.

What we claim as our invention is—

1. A valve consisting of a metal cup E' provided with an inlet orifice "$e$," and an exhaust orifice $e'$, an open metal top $E^2$, a plate $e^4$ provided with a passage $e^2$ located at the base of the top $E^2$, and a valve normally closing the exhaust orifice and opening communication through the top $E^2$, orifice $e^2$ and orifice "$e$," and pneumatic devices to operate said valve, substantially as described.

2. The combination with a wind chest A, of a wind box communicable therewith, a pneumatic D' communicating with said wind box provided with a valve D controlling said communication, and a valve E to control the communication of the pneumatic with said wind box, said valve consisting of a metal cup E' provided with an inlet orifice normally communicating with the wind chest and with a passage leading to said pneumatic, and with an orifice through which said pneumatic may exhaust, a top $E^2$ having a threaded engagement with said cup opening therewith and into the wind box, and a pneumatically operated valve $E^3$ within the cup to control said orifices in said cup and the opening in said top, substantially as described.

3. A valve consisting of a metal cup E' provided with a flange or seat Q and with communicable orifices, a channeled plate $e^4$ resting on said flange or seat, a hollow metal top $E^2$ engaged with said cup and holding said plate firmly to its seat, a pneumatically operated valve $E^3$ controlling the communication of said orifices and through said plate and top, and a guide $E^4$ for the stem of said valve, substantially as described.

In testimony whereof we sign this specification in the presence of two witnesses.

EDWIN S. VOTEY.
WILLIAM D. WOOD.

Witnesses:
CALVIN W. GIBBS,
W. S. WRIGHT.